(12) United States Patent
Leining (10) Patent No.: US 6,409,460 B1
(45) Date of Patent: Jun. 25, 2002

(54) RACK UNLOADER

(75) Inventor: Lyndon R. Leining, Austin, MN (US)

(73) Assignee: Hormel Foods, LLC, Austin, MN (US)

( * ) Notice: Subject to any disclaimer, the term of this patent is extended or adjusted under 35 U.S.C. 154(b) by 0 days.

(21) Appl. No.: 09/545,812

(22) Filed: Apr. 7, 2000

(51) Int. Cl.$^7$ ............................................... B66F 11/00
(52) U.S. Cl. .................................. 414/745.9; 414/746.1
(58) Field of Search .......................... 414/745.1, 745.9, 414/746.1, 746.4, 746.3, 715, 642, 728, 664; 99/357, 450.1

(56) References Cited

U.S. PATENT DOCUMENTS

| | | | |
|---|---|---|---|
| 4,547,931 A | 10/1985 | Staudenrausch et al. | 17/1 F |
| 5,067,620 A | 11/1991 | Norrie | 211/113 |
| 5,082,419 A | 1/1992 | Kollross et al. | 414/786 |
| 5,121,677 A | * 6/1992 | Le Claire et al. | 99/357 |
| 5,238,353 A | 8/1993 | Kollross et al. | 414/746.4 |
| 5,354,230 A | 10/1994 | McFarlane et al. | 452/51 |
| 5,709,523 A | * 1/1998 | Ware | 414/715 |

OTHER PUBLICATIONS

Abstract of Simonsen et al. U.S. Patent 3,792,508.
Abstract of Trottmann U.S. Patent 4,494,276.
Abstract of Simonsen U.S. Patent 3,732,971.
Abstract of Buller–Colthurst U.S. Patent 4,322,874.
Abstract of Neubeck, Jr. et al U.S. Patent 3,738,554.

* cited by examiner

Primary Examiner—Kenneth W. Noland
(74) Attorney, Agent, or Firm—Mau & Krull, P.A.

(57) ABSTRACT

A rack unloader apparatus (10) is used for unloading bars (150) having a plurality of pepperoni sticks (160) from a drying rack (140). The apparatus (10) includes a rail (23) operatively connected to a support frame (20). A motor (62) is operatively connected to a sliding mechanism (30) mounted on the rail (23) for moving the sliding mechanism between first and second positions. A pickup arm (40) has the sliding mechanism (30) operatively connected thereto proximate its first end (40a). A pickup arm assembly (103) is operatively connected to the second end (40b) of the pickup arm (40). A lifting mechanism (51) is carried by the sliding mechanism (30). The lifting mechanism (41) is operatively connected to the pickup arm (40) to move the second end of the pickup arm vertically, wherein the pickup assembly (103) is indexed to the rack (140) and lifts the pickup arm assembly (103) and removes the bar (150) from the rack (140).

10 Claims, 6 Drawing Sheets

RACK UNLOADER

BACKGROUND OF THE INVENTION

1. Field of the Invention

This invention relates generally to a rack unloader and more particularly to an unloader for removing rows of sausage sticks from a rack.

2. Description of the Prior Art

Sausages, such as pepperoni sausages, are formed in a stuffing operation in which the sausage emulsion is stuffed into a casing. The sausage stuffed casings are then clipped, smoked and further processed until the sausages are completely formed. After the sausages are formed, the casing is often removed to permit slicing of the sausage sticks for sale to consumers or institutions. Removal of the casing from the sausage sticks may be accomplished in a manual operation. However, such an operation is both time consuming and labor intensive. U.S. Pat. No. 4,682,387 discloses a mechanical method and apparatus for removing casings from sausage sticks. Further, my copending application Ser. No. 09/167,386 entitled "Method and Apparatus for Stripping Casings From Sausages", filed Oct. 6, 1998, is another example of a mechanized method and apparatus for removing casings from sausage sticks, which application is hereby incorporated by reference.

The mechanized apparatus is for removing casings from sausage sticks require a large volume of sausage sticks to be stripped. The sausage sticks are typically supported on a bar by means of a string. The string is tied around the clipped end of the sausage and is looped around the bar. These bars are then hung along a rack and the rack provides the storage of the sausage sticks until they are ready to be stripped. The manual removal of the bars holding the sausage sticks from the rack is a time consuming and tiring job. With the advent of the mechanized strippers, the workers supplying the sausage to the mechanized strippers have a difficult job. There is therefore a need for an improved method and apparatus for unloading the sausage sticks from the rack and supplying them to the casing stripping apparatus.

SUMMARY OF THE INVENTION

The present invention is an apparatus for unloading a rack having a plurality of bars. Each bar has a plurality of pepperoni sticks attached thereto. The apparatus includes a support arm operatively connected to a support. A first motor is operatively connected to a sliding mechanism mounted on the support arm for moving the sliding mechanism between first and second positions. A pickup arm has first and second ends. The sliding mechanism is operatively connected to the pickup arm proximate the first end. A lifting bar is operatively connected to the second end of the pickup arm. A lifting mechanism is carried by the sliding mechanism. The lifting mechanism is operatively connected to the pickup arm to move the second end of the pickup arm vertically, wherein the lifting bar is indexed into the rack by the sliding mechanism from the first position to the second position and lifts the bar having the pepperoni sticks and removes the bar from the rack.

The invention is also a method of unloading a rack having a plurality of bars, each bar having a plurality of pepperoni sticks. The method includes extending a pickup arm into the rack and under the bar. The pickup arm is then moved up to lift the bar from the rack. The pickup arm is then retracted to clear the rack and the pickup arm is lowered to a position to allow for the removal of the pepperoni sticks from the bar.

DETAILED DESCRIPTION OF THE PREFERRED EMBODIMENT

Referring to the drawings, wherein like numerals represent like parts throughout the several views, there is generally disclosed at 10 a rack unloader apparatus. The rack unloader apparatus 10 includes a support frame generally designated at 20. The support frame includes first and second upright members 21, 22, the first ends of which 21a, 22a are supported on a floor. A rail 23 is operatively connected between the second ends 21b, 22b of the upright members 21 and 22. The rail 23 has a first cross member 24 operatively connected to its first end 23a by suitable means such as welding. A second cross member 25 is operatively connected to the rail 23 second end 23b again by suitable means such as welding. The cross members 24, 25 are each captured between two mounting clamps 26. The mounting clamps 26 have four apertures through which four bolts 27 are inserted and are received in a cap 21c, 22c which are connected to the upright members 21, 22 by suitable means such as welding.

A trolley assembly, generally designated at 30 is provided for movement along the rail 23. The trolley assembly 30 includes a trolley or mounting member 31 that is mounted for slidable movement along the rail 23. The trolley 31 is movably mounted on the rail 23 by a series of cam followers. Two top mounting segments 31a are operatively connected to the trolley 31. The top cam followers 32 are secured by hexagonal jam nuts 33 to the segments 31a. Similarly, two bottom mounting segments 31b operatively connected to the trolley 31 and bottom cam followers 34 are secured by a hex nut 35 to the segments 31b. First side mounting segments 31c are operatively connected to the trolley 31 and extend away from the trolley 31 and across the top of the rail 32. Then, the side cam followers 36 are connected by hex nuts 37 to the segments 31c. Second side mounting segments 31d are connected to the trolley 31. The second side cam followers 38 are secured to the mounting segments 31d by hex nuts 39. Each of the mounting segments 31a through 31d have apertures through which the shaft portion of the cam followers 32, 34, 36 and 38 are positioned. The circular surfaces of the eight cam followers 32, 34, 36 and 38 are thus able to rotate on the shafts and also capture the rail 23 allowing for the trolley 30 to be slid along the rail 23 and still absorb any torque to keep the trolley stable. While the mounting segments 31a through 31d are shown as discrete members that are secured to the trolley by suitable means such as bolts (not shown), it is also understood that the mounting segments could be formed as an integral portion of the trolley 31. It is further understood that other suitable sliding mounting mechanisms may also be used to mount the trolley 31 along the rail 23.

An arm 40 is operatively connected to and carried by the trolley 31 and pivots with respect to the trolley 31. A mounting block 42 having two apertures 42a is secured to the trolley 31 by suitable means such as welding. Alternately, it could be formed as an integral portion of the trolley 31. Two arm pivot weldments 41 have two upper apertures 41a which are utilized to secure the arm pivot weldments 41 to the mounting block 42 by bolts 43. An arm pivot spacer 44 is secured between the arm pivot weldments 41 by bolts 45.

At the bottom of each weldment 41 is a cylindrical portion having a bore 41b. The first end 40a of the arm 40 is operatively connected thereto by a pivot pin-mounting member 46. Pivot pins 46a are positioned in the bores 41b and held in place by thrust bearing 48 and journal bearing 47. The arm 40 is thereby pivotable around the pins 46a in the bores 41b. A jackscrew boom 49 is secured to the trolley 31 by bolts 50. The jack screw boom 49 has a bore 49a formed at one end. A screw jack 51 is operatively connected between the boom 49 and the arm 40. At one end, the screw jack 51 has two bosses 51a having a longitudinal bore 51b formed therein. The screw jack 51 is operatively connected to the boom 49 by a screw jack pivot pin 52 which is positioned in the bores 51b and 49a. The pin is held in place by retaining rings 53. The jack screw 51 has a rod 51c which is connected to a rod eye 54 by a hexagonal jam nut 55. A clamp 56 is positioned on the bottom of the arm 40 and a screw jack mounting block 57 is positioned on the top of the arm 40. The clamp 56 and screw jack mounting block 57 are secured together by hexagonal bolts 60 and thereby firmly secured to the arm 40. The screw jack mounting block 57 has two bores 57a formed therein. The rod eye 54 is positioned in the mounting block 57 and the pivot pin 58 is positioned through the bores 57a and through the rod eye 54. The pin is held in place by retaining rings 59. Therefore, when the screw jack 51 is operated, the rod 51c extends in and out of the screw jack 51. When the rod 51c is extended, the arm 40 is pivoted about the pivot pins 46a, thereby raising and lowering the second end 40b of the arm 40. An electrical control box 61 is mounted to the trolley 31 by suitable means such as bolts (not shown).

A servo motor 62 is operatively connected to the rail 23. A mounting clamp 64 is positioned on one side of the rail 23 and a mounting block 63 is positioned on the other side of the rail 23. Four bolts 65 then secure the block 63 to the clamp 64. A gear box 68 is secured to the servo motor 62 by four bolts 66. The gear box 68 is secured to the mounting clamp 63 by four bolts 67. The mounting block 63 has an opening 63a in which the gear box 67 is positioned. The output of the gear box 68 is operatively connected to the timing pulley 70 by a transtorque 69. Timing pulley side guards 71 are secured to the timing pulley by screws 72. A timing belt 73 is positioned around the timing pulley 70 at one end and around a second timing pulley 74 at its other end. The second timing pulley 74 is supported proximate the second end 23b of the rail 23. A mounting flange 23c depends downwardly from the rail end 23b and is operatively connected thereto. Bearings 77 and 78 are positioned in the timing pulley 74 and timing pulley side guards 71 are secured by screws 80. A timing belt pulley shaft 76 is positioned through the openings in the bearings 77 and 78 and is connected to the timing belt pulley shaft end 83 by screws 81. Seals 79 are positioned outside of the timing pulley side guards 71. Also, a grease zerk 82 is positioned in the timing belt pulley shaft end 83. Screws 84 secure the timing belt pulley shaft to the flange 23c. A dowel 75 is positioned in slot 75c and is captured between the flange 23c and timing belt pulley shaft 76, thereby allowing adjustment of the belt 73 for better tracking.

Figure 2A:
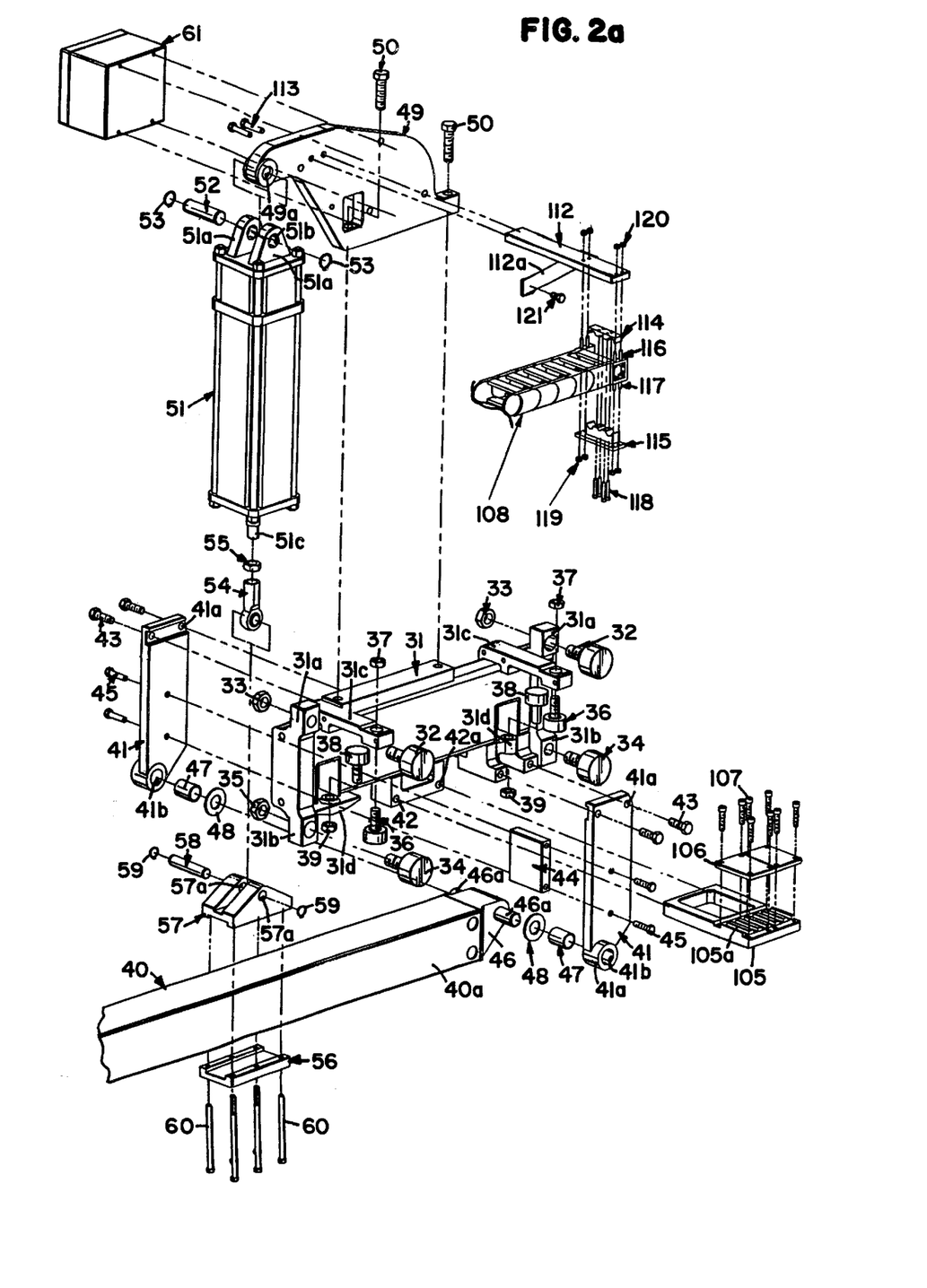
FIG. 2a is an exploded perspective view of a portion of the trolley and lift arm shown in FIG. 1.
Figure 2B:
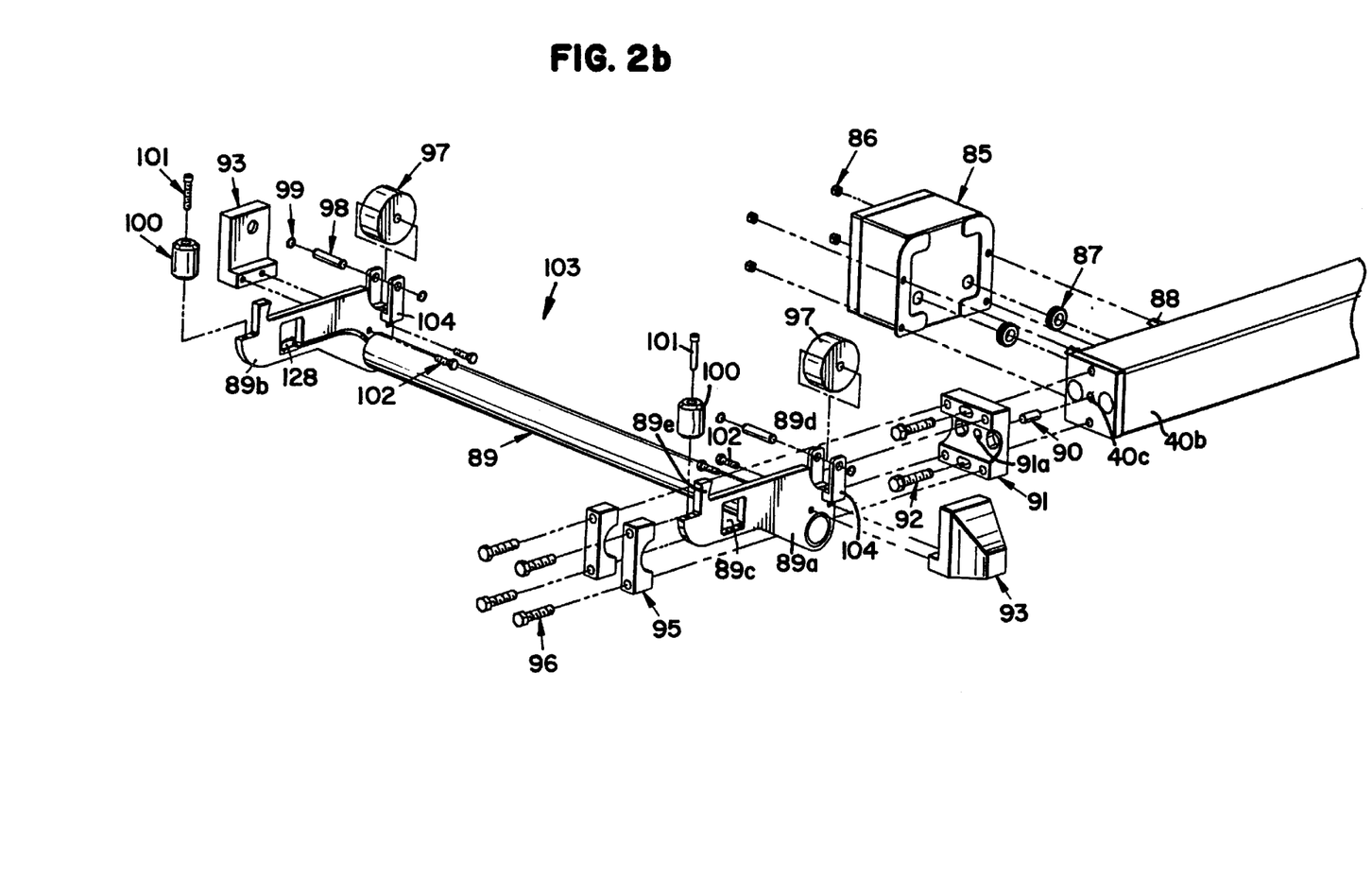
FIG. 2b is an exploded perspective view of a portion of the trolley arm shown in FIG. 1.
Figure 3A:
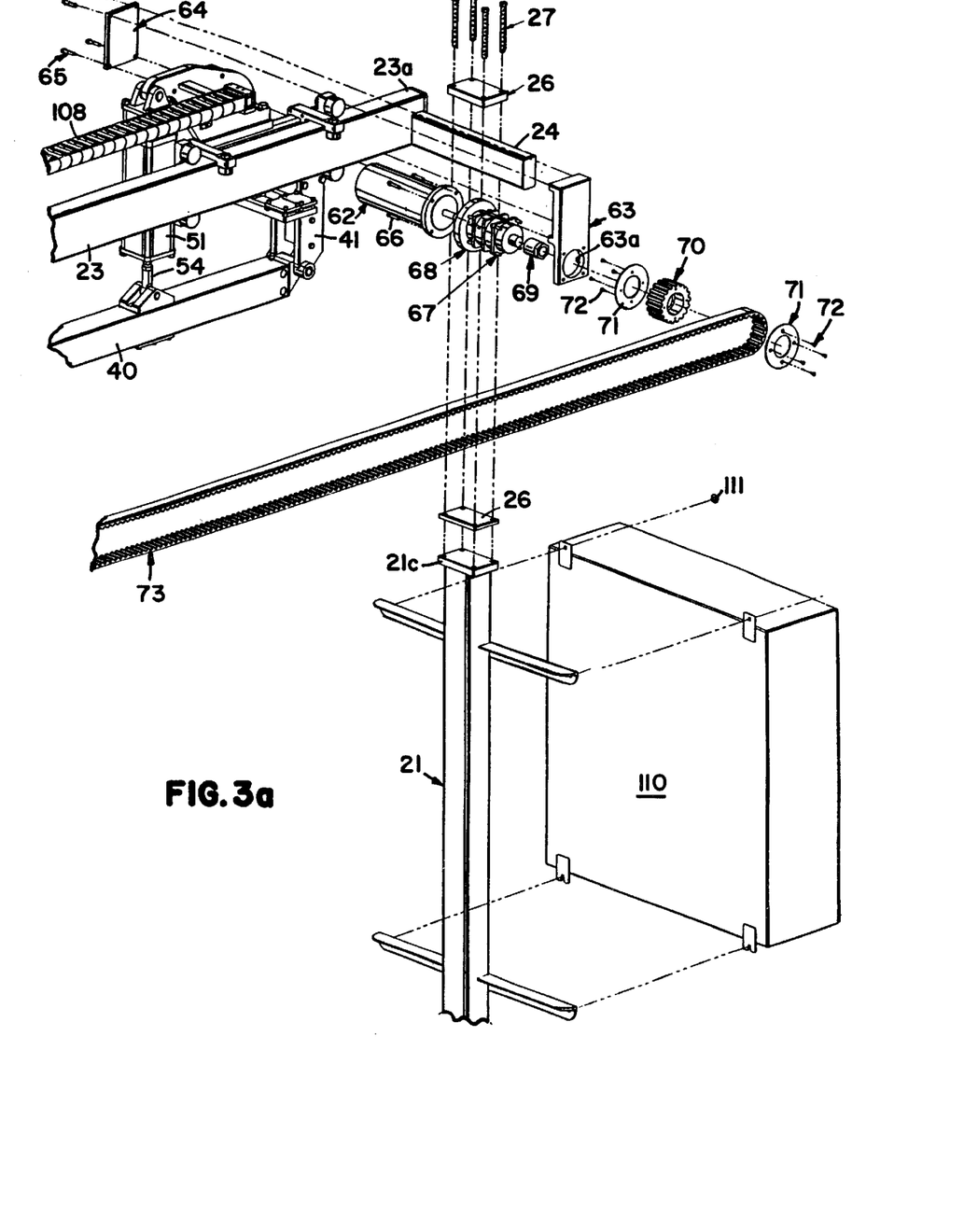
FIG. 3a is a perspective view of a portion of the invention shown in FIG. 1 with portions shown in an exploded view.
Figure 3B:
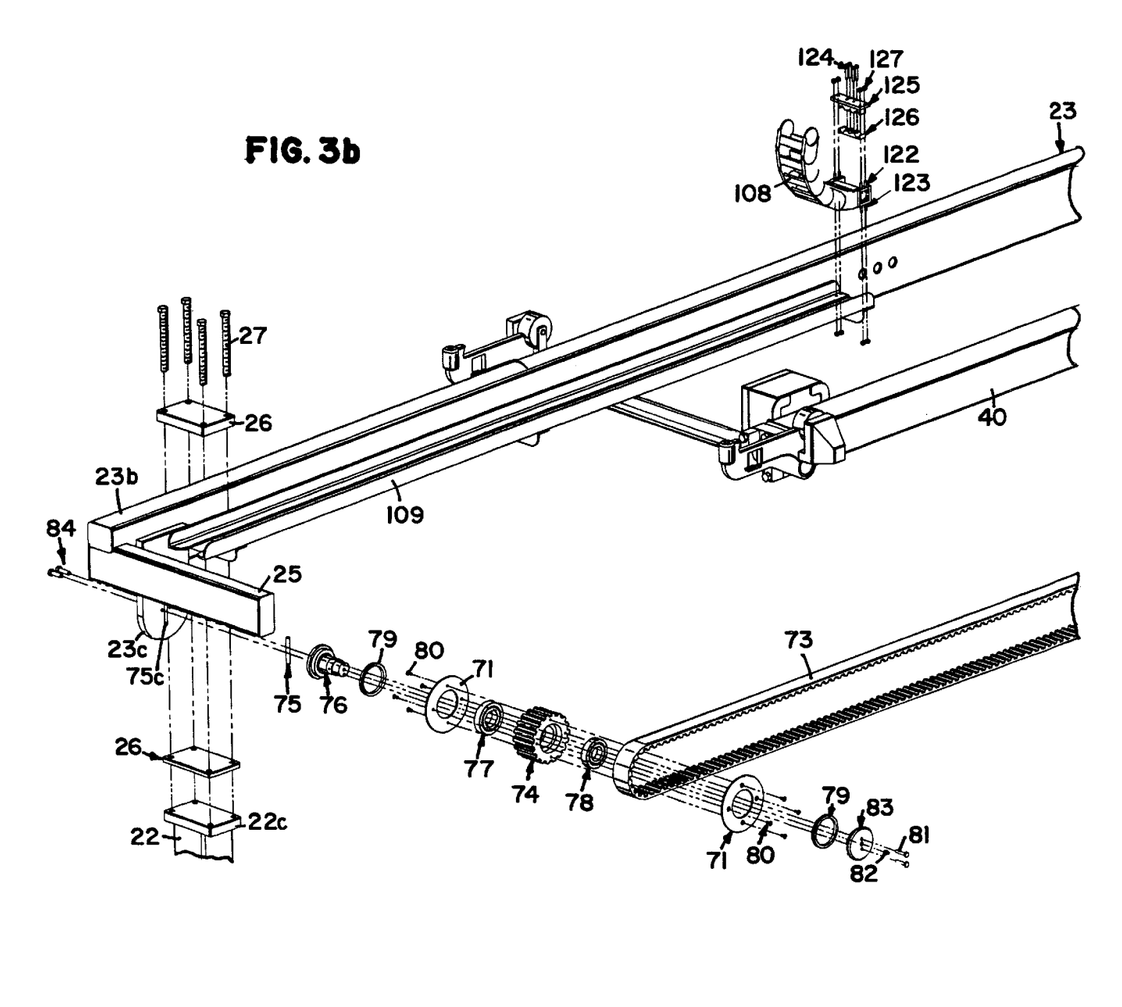
FIG. 3b is a perspective view of a portion of the invention shown in FIG. w with portions shown in an exploded view.

A pickup arm assembly, generally designated as 103, as best seen in FIG. 2b, is secured to the second end 40b of the arm 40. A hook tube 89 has a first side member 89a and a second side member 89b operatively attached to its ends by suitable means such as welding. The side members 89a and 89b are mirror images of each other, so the attachment of one side member 89a will be described in detail, it being understood that the construction of the other side member 89b is similar. The side member 89a has an electric eye opening 89c formed therein. An electric eye 128 is shown in one of the openings 89c, the electric eye in the other opening 89c not being shown. Any suitable electric eye may be utilized. A resting surface 89d is formed along the top, the function of which will be described in more detail hereafter. A forward stop 89e is formed in front of the resting surface 89d. A hook skid 93 is secured to the side member 89a by bolts 102. The body of the skid 93 forms a rear stop and is adjacent the resting surface 89d. A cylindrical skid 100 is secured to the side member 89a by screw 101. A skid wheel 97a is rotatably mounted by pin 98 and held in place by retainer ring 99 between a yoke 104. The skid wheel 97 is a sliding member which provides a sliding surface which contacts the underneath side of a longitudinal member 142 of the drying rack 140.

The left side of the pickup arm assembly is secured to the arm 40. A dowel pin 90 is inserted into an aperture 40c formed at the end of the arm 40. The dowel extends outward and is inserted into an opening 91a formed in the mounting block 91. The mounting block 91 is then secured to the arm 40 by bolts 92 and washers (not shown). Two mounting clamps 95 are then positioned on either side of the hook tube 89. The mounting clamps 95 are then secured to the mounting block 91 by hexagonal bolts 96. A Hoffinan electrical box 85 is secured to the second end 40b of the arm 40 by locking nuts 86 and mounting bolts 88, which extend from the bar 40. Grommets 87 may also be utilized.

Referring now to FIG. 2a, a timing belt clamping block 105 is secured to the mounting block 42 by bolts (not shown) which extend through the apertures 42a and are secured in the clamping block 105. The clamping block 105 has a surface 105a which mates with the surface of the timing belt 73. The timing belt 73 is placed on top of the surface 105a such that the raised portions of the timing belt 73 match with the surface 105a. Then, screws 107 are utilized to secure the timing belt clamping plate 106 in position over the clamping block 105, thereby securing the belt between the clamping block 105 and plate 106, and thereby to the mounting block 42 and hence to the trolley 31. Therefore, as the timing belt 73 rotates around the timing pulleys 70 and 74, the trolley 31 is moved.

Figures 4, 5:
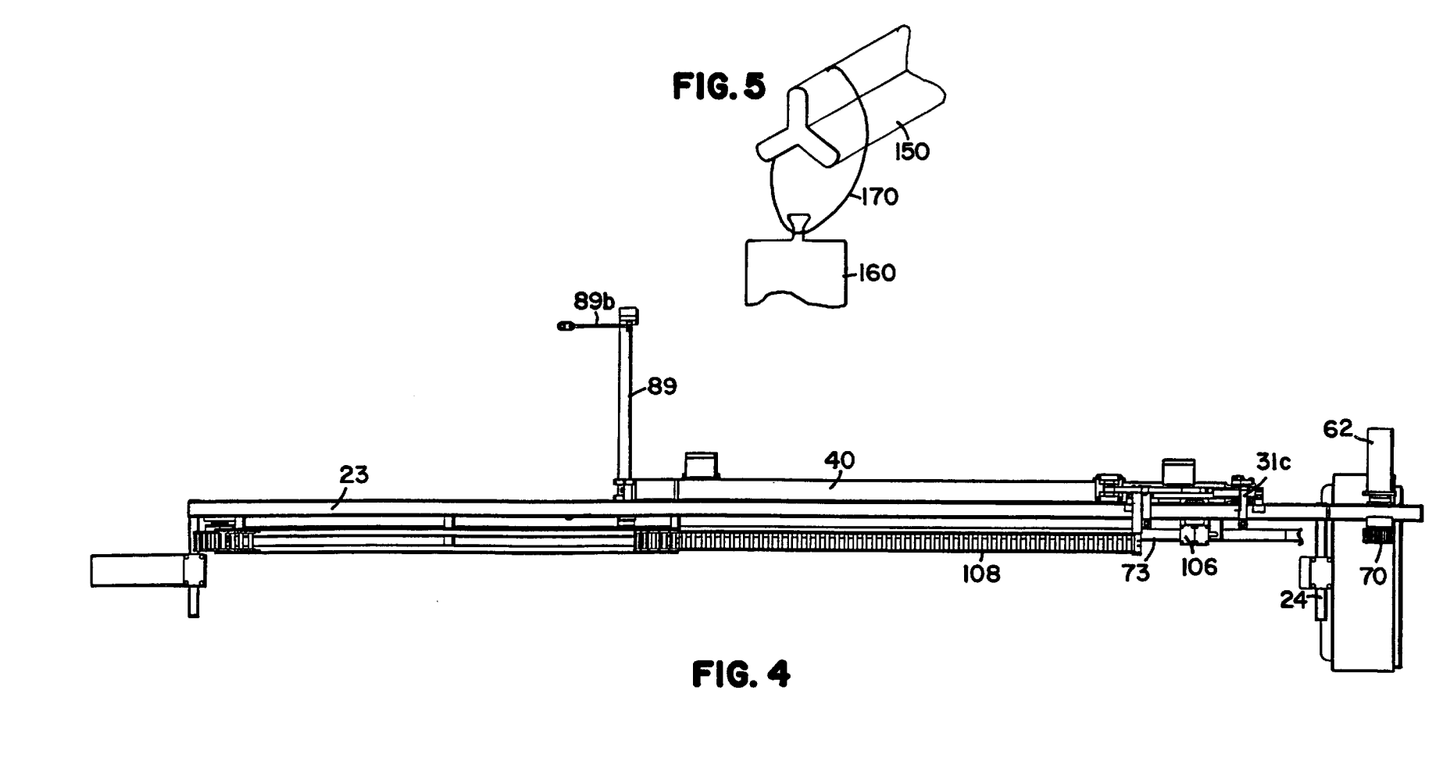
FIG. 4 is a top plan view of the invention shown in FIG. 1.
FIG. 5 is a partial perspective view of the bar with a pepperoni stick suspended from the bar.

An Igus energy chain 108 has one end secured to the jackscrew boom 49 and its other end secured to a track 109. The track 109 is secured to the rail 23 proximate the second end 23b by means well known in the art such as welding. The track 109 provides a receptical for the chain 108 as the trolley 30 moves towards the second end 23b. The energy chain 108 carries the power and cables for feedback to the control box 110 which houses suitable controls. The control box 110 is mounted to the upright 21 by suitable bolts and washers 111. One suitable method of attaching the energy chain 108 to the boom 49 is the use of a chain mount 112 that is secured to the boom 49 by bolts 113. Plates 114 and 115 are secured to the end of the chain 108 and also to the chain mount 112 by bolts 116, 117 and 118 and nuts 119, 120. The chain mount 112 is also further secured to the boom 49 by screw 121 through support 112a. The other end of the chain 108 is secured to the track 109 by bolts 122, 123 and 124, clamps 125, 126 and nuts 127. FIG. 4 also shows the full energy chain 108 in position when the arm is retracted and also a portion of the chain 108 when he arm 40 is in an extended position.

The drying rack 140 may be any suitable drying rack which may store a plurality of bars 150. Drying racks 140 are well known in the art and typically include at least a pair of horizontal members 141 that are supported by a frame of the drying rack 140. The bars 150 have a length which is slightly longer than the shortest distance between the horizontal members 141. Therefore, the bars 150 rest in notches on the top of the members 141. The bars may not be loaded from the top because of rack members 142 so are loaded from the end of the rack 140. Again, such racks 140 and horizontal bars 150 are well known in the art.

The drying rack 140 supports a plurality of bars 150 on which a plurality of pepperoni sticks 160 are hung by strings 170. FIG. 5 shows a perspective view of a portion of the bar 150. The bar 150 has a generally Y-shaped cross section. The two bottom segments of the Y-shape rest on the drying rack 140. Further, the two bottom members of the Y-shaped cross section are the portion of the bar 150 that is positioned on the resting surfaces 89d, as will be described more fully hereafter.

In operation, the drying rack 140, with a plurality of bars 150 each having a plurality of pepperoni sticks 160 is placed in position at the end of the rail 23. The pickup arm 40 is in the position shown in FIG. 1, and namely in a retracted position and horizontal. Then, the screw jack 51 is activated to extend the rod 51c downward to slightly pivot the arm 40. The servo motor 62 is then activated and the trolley assembly 30 which would include the pick-up arm assembly 103 is moved forward rapidly at a speed of approximately three feet per second. When the electric eye 128 senses a hanging pepperoni 160, the speed of rotation of the servo motor 62 and therefore the timing belt 73 is slowed and the pickup arm assembly 103 travels a preprogrammed distance into the rack 140 sufficiently far enough to pickup two bars 150. The particular distance would depend upon the spacing of the bars 150 on the rack 140. The second rate of speed is approximately ½ foot per second. It is understood other suitable speeds may be used, but by having the faster rate of speed four to eight times that of the slower rate, a more efficient operation is possible.

Figure 1:
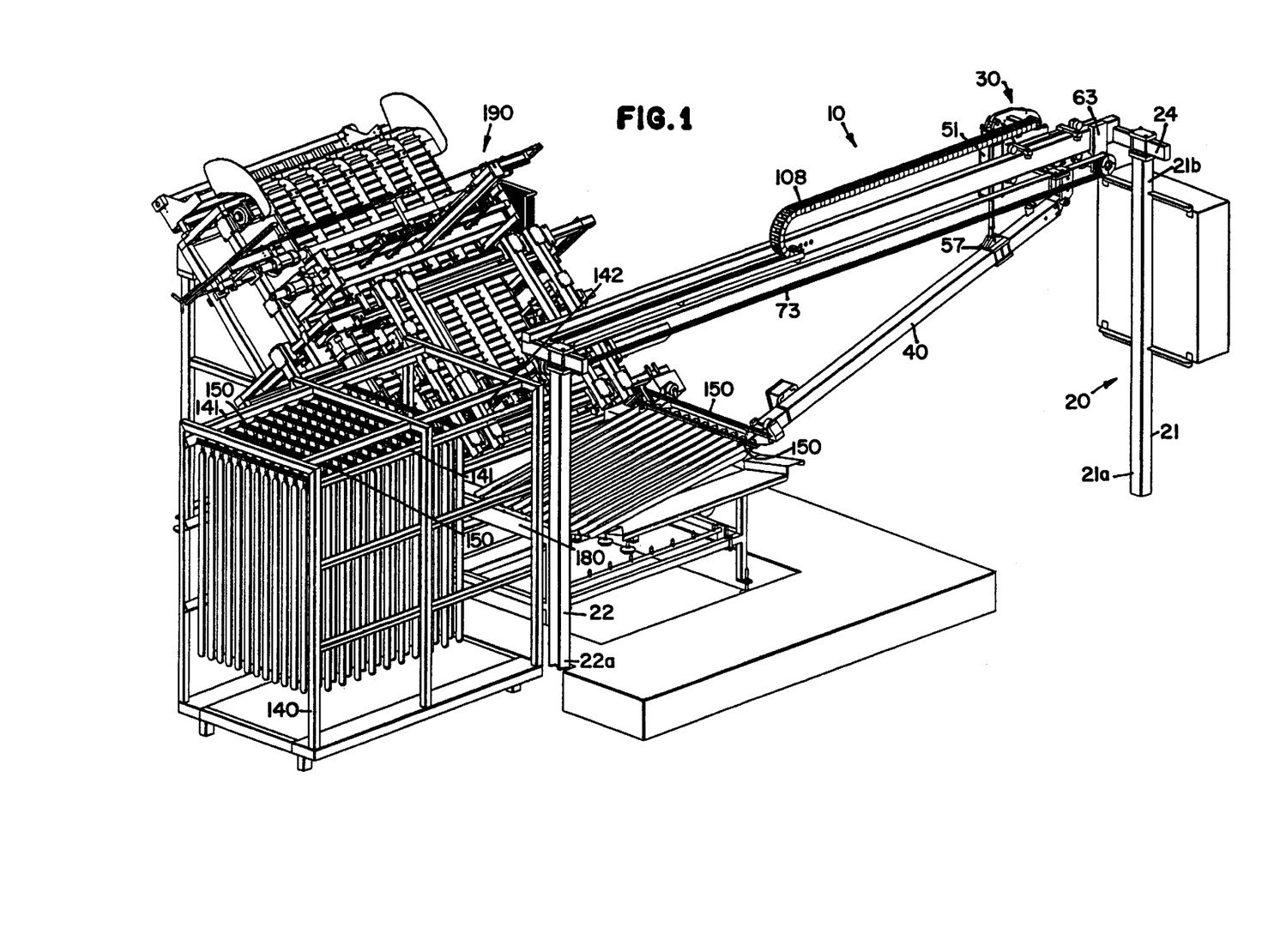
FIG. 1 is a perspective view of the rack unloader in accordance with the present invention.

The screw jack 51 is then operated such that the rod 51c retracts, thereby pivoting the pickup arm assembly 103 upwards. This causes the bars 150 to contact the resting surfaces 89d and lift the bars 150 off of the rack 140. The skid wheels 97 contact the underneath side of longitudinal members 142 of the drying rack 140. The longitudinal members 142 extend between the ends of the rack 140 and are located above the horizontal member 141 and is generally parallel to the members 141. The servo motor 62 is then reversed and the pickup arm assembly 103 is then moved out of the rack 140. The arm 40 continues to retract which causes the pepperoni 160 to contact the input end 180 of the stripping machine 190. The arm 40 is then pivoted downward by operation of the jackscrew 51 to drop the pepperoni sticks 160 across the input end 180 as shown in FIG. 1. An operator would then cut the strings 170 supporting the pepperoni sticks 160 and the pepperoni sticks would then be free from the bar 150. The bars 150 are then removed by the operator and the operator then sequences the apparatus 10 through another cycle. However, on the next cycle, the trolley 31 would move toward the rack at a faster speed for an additional distance to compensate for the fact that two bars have been removed. This additional distance would of course depend upon the spacing of the bars. Typically, the two bars would take an additional 10⅜ inches. Therefore, the trolley can be extended outward at a higher speed for a longer distance, thereby shortening the cycle time. When a new rack is provided, the controls are reset to the full rack rapid transverse distance. While the apparatus 10 removes two bars at a time from the rack, it is understood only one bar may be removed, or more than two bars by adjusting the length of the resting surface 89d as it relates to the spacing between the bars 150 on the rack 140.

It is understood that suitable software and controls may be utilized to carry out the present invention. Such controls and software being well known to one skilled in the art.

The above specification, examples and data provide a complete description of the manufacture and use of the composition of the invention. Since many embodiments of the invention can be made without departing from the spirit and scope of the invention, the invention resides in the claims hereinafter appended.

I claim:

1. An apparatus for unloading a rack, having a plurality of bars, each bar having a plurality of pepperoni sticks attached thereto, the apparatus comprising:
    a) a support arm operatively connected to a support;
    b) a first motor operatively connected to a sliding mechanism mounted on the support arm for moving the sliding mechanism between first and second positions;
    c) a pick-up arm having first and second ends, the sliding mechanism operatively connected to the pick-up arm proximate the first end;
    d) a lifting bar operatively connected to the second end of the pick-up arm; and
    e) a lifting mechanism carried by the sliding mechanism, the lifting mechanism operatively connected to the pick-up arm to move the second end of the pick-up arm vertically, wherein the lifting bar is indexed into the rack by the sliding mechanism from the first position to the second position and lifts the bar having the pepperoni sticks and removes the bar from the rack.

2. The apparatus of claim 1, the sliding mechanism comprising a trolley slidably mounted on the support arm, a driven belt mounted to the support arm and the driven belt operatively connected to the trolley to move the trolley between the first and second positions.

3. The apparatus of claim 2, the first end of the pick-up arm pivotally connected to the trolley.

4. The apparatus of claim 3, wherein the lifting mechanism has a first end operatively connected to the trolley and a second end operatively connected to the pick-up arm, wherein an extension of the lifting mechanism moves the second end of the pick-up arm vertically.

5. The apparatus of claim 4, further comprising a first servo motor operatively connected to the driven belt to control movement of the driven belt.

6. The apparatus of claim 4, wherein the lifting mechanism comprises an extendable arm having a first end operatively connected to the trolley and a second end pivotally connected to the pick-up arm, wherein extension of the extendable arm lowers the second end of the pick-up arm.

7. The apparatus of claim 1, further comprising a sensor operatively connected to the pick-up arm to sense location of the pick-up arm as the pick-up arm enters the rack.

8. The apparatus of claim 1, further comprising a sliding member operatively connected to the lifting bar.

9. A method of unloading a rack having a plurality of bars, each bar having a plurality of pepperoni sticks, the method comprising:
   a) extending a pick-up arm into the rack and under the bar;
   b) moving the pick-up arm up to lift the bar from the rack;
   c) retracting the pick-up arm to clear the rack; and
   d) lowering the pick-up arm to position the pepperoni sticks for removal from the bar, wherein the pick-up arm is moved at a first, higher velocity to reach the rack and the pick-up arm then proceeds at a slower speed to find the bar.

10. The method of claim 9, further comprising:
   a) removing the bar from the pick-up arm; and
   b) extending the pick-up arm back into the rack at a high velocity for a new distance equal to a previous distance the pick-up arm traveled previously and for an incremental distance, the incremental distance depending on a distance between bars on the rack.

* * * * *